United States Patent [19]

Curran

[11] Patent Number: 5,113,244
[45] Date of Patent: May 12, 1992

[54] FIBER OPTIC COMBINER/SPLITTER

[75] Inventor: Mark E. Curran, Oceanside, Calif.

[73] Assignee: General Dynamics Corporation, Electronics Division, San Diego, Calif.

[21] Appl. No.: 651,635

[22] Filed: Feb. 6, 1991

[51] Int. Cl.$^5$ ............................ G02B 6/28; G02B 6/32
[52] U.S. Cl. ........................................ 385/24; 385/34; 385/36; 385/115; 359/129; 359/131; 359/709
[58] Field of Search ............... 350/96.15, 96.16, 96.18, 350/96.19, 96.20, 96.22, 96.24, 96.31, 413, 432, 436, 435; 370/1, 3, 4; 385/34, 36, 33, 46, 44, 48, 115, 72, 74, 24; 359/115, 124, 129, 131, 709

[56] References Cited

U.S. PATENT DOCUMENTS

| | | | |
|---|---|---|---|
| 3,547,526 | 12/1970 | Devereux | 350/96.18 |
| 4,834,484 | 5/1989 | Gorman et al. | 350/96.18 |
| 4,842,355 | 6/1989 | Gold et al. | 350/96.20 |
| 4,961,622 | 10/1990 | Gorman et al. | 350/96.18 |
| 4,997,250 | 3/1991 | Ortiz et al. | 350/96.18 |

Primary Examiner—Brian Healy
Attorney, Agent, or Firm—Brown, Martin, Haller & McClain

[57] ABSTRACT

The fiber optic combiner/splitter is a positive and negative axicon combination which can convert a ring-shaped beam into a solid beam. The positive half of the axicon is effectively a plano-convex lens where the convex surface is generally a shallow cone. The flat surface of the lens abuts each end of an array of single mode fibers which are arranged in a ring configuration around a support member. The negative half of the axicon is effectively a plano-concave lens which is complementary to the positive lens. The focused beams from the positive half of the axicon are combined to form a single beam which is then directed into a single optical fiber. For conversions in the reverse direction, light is taken from a single multimode fiber and expanded into a ring-like pattern. The ring of light is picked up by the ring of single mode fibers. Each single mode fiber receives an equal amount of optical energy or power to provide good efficiency in splitting of the multiplexed beam.

13 Claims, 1 Drawing Sheet

FIBER OPTIC COMBINER/SPLITTER

BACKGROUND OF THE INVENTION

Fiber optic communications networks, optical data buses and optical beamformers call for joining of single optical fibers to multiple fibers. In particular, frequency division multiplexing (FDM) requires efficient optical splitting and combining. Typical couplers are selected from direction couplers, star couplers and power splitters.

Directional couplers are based on parallel cores of single-mode fibers, where the cladding is partially removed, or parallel single-mode waveguides on a substrate. Optical tunneling provides the means for energy transfer where parts of the core or waveguides are brought close enough together to obtain the desired coupling fraction. Directional couplers can be used for simple distribution of power, for example, from one fiber equally into two fibers.

Branching devices can be made on a substrate where the waveguide splits into two fibers to branch off small portions of energy, or power splitting can be achieved with the aid of filters. Such devices are subject to losses, and the aperture angle should be kept as small as possible, on the order of 1°. When such a device is used to combine optical signals with the same wavelength a loss of 3-dB occurs.

Star couplers can be made for splitting and combining more than two optical signals using a cascade of either branching devices or directional couplers. However, the branching devices have high loss due to the 3-dB loss each time two signals are combined. Directional couplings are difficult to manufacture, at least monolithically, due to the existence of crossings.

It would be desirable to provide a device and method for combining a number of optical signals carried by separate fibers which has a low insertion loss and is relatively easy to manufacture. It is also desirable to provide a complimentary device and method for splitting off a number of optical signals from a single fiber with low loss. It is to such a device and method that the present invention is directed.

SUMMARY OF THE INVENTION

It is an advantage of the present invention to provide a means for combining multiple optical signals into a single optical beam with high efficiency.

It is a further advantage of the present invention to provide a means for efficiently splitting an optical beam into multiple signals for transmission by multiple optical fibers.

It is another advantage of the present invention to provide an efficient combiner/splitter for use in fiber optic communication networks.

In an exemplary embodiment, the fiber optic combiner/splitter is a positive and negative axicon combination which can convert a ring-shaped beam into a solid beam. The positive half of the axicon is effectively a plano-convex lens where the convex surface is generally a shallow cone. The flat surface of the lens abuts each end of an array of single mode fibers which are arranged in a ring configuration around a support member.

The negative half of the axicon is effectively a plano-concave lens which is complementary to the positive lens. The focused beams from the positive half of the axicon are combined to form a single beam which is then directed into a single optical fiber.

For conversions in the reverse direction, light is taken from a single multimode fiber and expanded into a ring-like pattern. The ring of light is picked up by the ring of single mode fibers. Each single mode fiber receives an equal amount of optical energy or power to provide good efficiency in splitting of the multiplexed beam.

A graded index (GRIN) lens is included at the joints between the axicon and each fiber which receives light to collimate the light entering the fiber. The GRIN lens assures that the maximum possible amount of incoming light is captured by the fibers.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENTS

Figure 1:
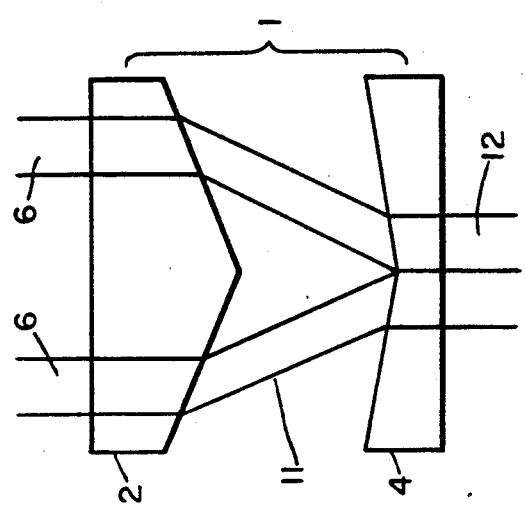
FIG. 1 is a diagrammatic side view of an axicon combiner/splitter for two beams according to the present invention.

As shown in FIG. 1, the combiner/splitter is a combination of two lens-like optics, a positive half 2 and a negative half 4, making up an axicon 1. Axicons are cone-shaped optics which can split and recombine collimated optical beams. The combination of positive and negative halves of an axicon can convert a ring-shaped beam into a solid beam, and conversely, can convert a solid beam into a ring-shaped beam.

Figure 2:
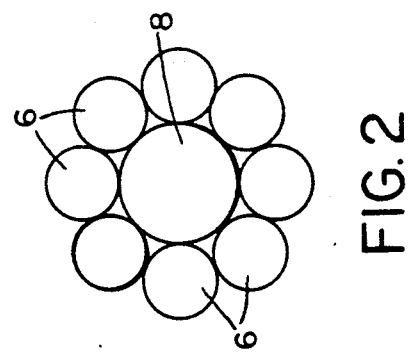
FIG. 2 is a cross-sectional view taken along line 2—2 of FIG. 1.

For a combiner, abutting positive half 2 of axicon 1 is an array of single mode optical fibers 6, each of which will carry the same wavelength of light. As shown in FIG. 2, the optical fibers 6 are arranged in a ring-pattern around a support member 8. The peak of the cone comprising positive half 2 is centered at the diametrical center of support member 8 so that light entering from fibers 6, in this case the source fibers, are all refracted at the same angle toward the focal point.

Figure 3:
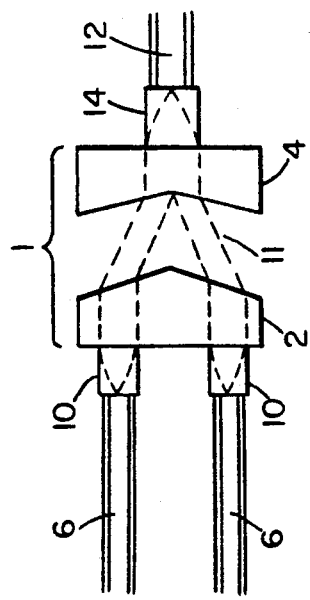
FIG. 3 is a diagrammatic view of an embodiment using graded index lenses for two beams.

At the interface between positive half 2 and optical fibers 6, in FIG. 3, a graded index lens (GRIN) 10 is used for each fiber 6 to create a collimated beam, assuring maximum efficiency in the transmission of light between the two elements.

Light received from the array of optical fibers 6 (source) is in the form of a ring. This ring of light is focused by positive half 2 toward its focus, the point at which a single solid beam is created by the combination of the incoming light.

The solid beam of light follows a path into negative half 4 of axicon 1 which collimates the light. By adjusting the space 11 between the positive half 2 and the negative half 4 of the axicon 1, the ratio of the diameters of the incoming and outgoing beams can be varied, permitting optimization of the solid beam diameter for efficient capture by optical fiber 12, the destination fiber.

The efficiency of light capture by the destination fiber is improved by using an optical fiber 12 with a mode volume greater than or equal to the sum of the mode volumes of the source fibers. Mode volume (MV) is defined as the square of the product of the core diameter and numerical aperture which relates to the light-gathering power of a fiber from an optical emitter. The numerical aperture of the destination fiber is increased by placing a GRIN lens 14 at the input, as shown in FIG. 3. A suggested pitch value for the GRIN lenses 10 and 14 is 0.25, but other values may be used.

The axicon splitter works in the opposite direction from the combiner. In this case, optical fiber 12 is the source fiber which abuts negative half 4, causing the beam entering from fiber 12 to be expanded into a ring of light. The ring of light is collimated by positive half 2 and is distributed evenly to optical fibers 6. The space 11 is adjusted to assure that the ring diameter of the beam matches the ring diameter of the array of fibers 6. A GRIN lens is located at the end of each fiber 6 for efficient capture of all incoming light for insertion low loss.

Figure 4:
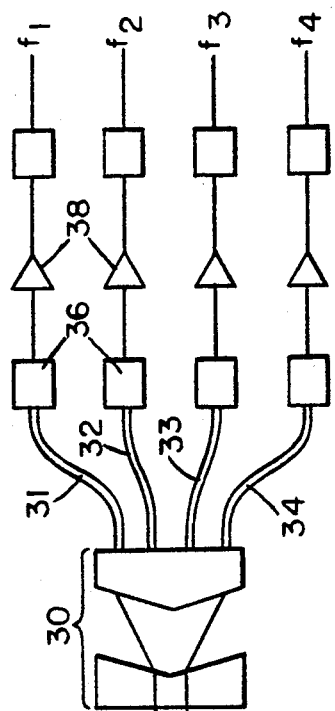
FIG. 4 is a diagrammatic view of a network application of the axicon combiner/splitter of the present invention.

An exemplary network application of the combiner/splitter is illustrated in FIG. 4. A frequency division multiplexed (FDM) link uses an axicon combiner 26 to combine the optical power of four different lasers 21-24, each modulated at a different frequency f1-f4, into a single fiber 28. This signal is transported to axicon splitter 30 where it is divided into equal power signals to each of the four destination fibers 31-34. Optical detectors 36 convert each optical signal to an electrical voltage which is amplified by amplifier 38 and filtered to strip off the appropriate channels.

The use of the axicon combiner/splitter improves the feasibility of communication and transmission networks using optical FDM which previously has been avoided due to the complexity of and the losses induced by the requisite modulators, demodulators and filters. The axicon combiner/splitter is readily manufacturable and provides high efficiency conversion of the optical signals from multiple to single fibers and vice versa.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A device for combining (splitting) a plurality of optical beams (to be) carried by a plurality of optical fibers into (from) a solid beam carried by a single optical fiber comprising:
   a first refractive optic having a first flat face and a cone-shaped face, said first flat face adjacent to an end of a bundle comprising said plurality of optical fibers; and
   a second refractive optic having a second flat face and an inverted cone-shaped face, said second flat face adjacent to an end of said single optical fiber;
   whereby said first and second refractive optics are aligned along a continuous optical path with a selected spacing therebetween so that combining of said plurality of optical beams is accomplished by focusing said plurality of optical beams to a focal point by said first refractive optic and directing said plurality of optical beams into said second refractive optic to be combined into said solid beam, and splitting of said solid beam is accomplished by expanding said solid beam by said second refractive optic and directing an expanded said solid beam into said first refractive optic where it is equally distributed to each optical fiber of said plurality.

2. A device as in claim 1 wherein said bundle comprises a support member surrounded by a ring of said plurality of optical fibers.

3. A device as in claim 1 wherein said single optical fiber is a multimode fiber.

4. A device as in claim 2 wherein said selected spacing is adjustable to permit a diameter of said solid beam to correspond to a diameter of a ring of center points of each optical fiber within said ring.

5. A device as in claim 1 further comprising a graded index lens disposed at said end of said single optical fiber.

6. A device as in claim 1 further comprising a graded index lens disposed at an end of said each optical fiber of said plurality.

7. A device as in claim 2 wherein said expanded said solid beam is in the shape of a ring.

8. A device for combining a plurality of optical beams carried by a plurality of optical fibers into a solid beam carried by a single optical fiber comprising:
   a first refractive optic having a first flat face and a cone-shaped face, said first flat face adjacent to an end of a bundle comprising said plurality of optical fibers; and
   a second refractive optic having a second flat face and an inverted cone-shaped face, said second flat face adjacent to an end of said single optical fiber;
   whereby said first and second refractive optics are aligned along a continuous optical path with a selected spacing therebetween so that combining of said plurality of optical beams is accomplished by focusing said plurality of optical beams to a focal point by said first refractive optic and directing said plurality of optical beams into said second refractive optic to be combined into said solid beam.

9. A device as in claim 8 further comprising a graded index lens disposed at said end of said single optical fiber.

10. A device as in claim 8 further comprising a graded index lens disposed at an end of said each optical fiber of said plurality.

11. A device for splitting a plurality of optical beams to be carried by a plurality of optical fibers from a solid beam carried by a single optical fiber comprising:
    a first refractive optic having a first flat face and a cone-shaped face, said first flat face adjacent to an end of a bundle comprising said plurality of optical fibers; and
    a second refractive optic having a second flat face and an inverted cone-shaped face, said second flat face adjacent to an end of said single optical fiber;
    whereby said first and second refractive optics are aligned along a continuous optical path with a selected spacing therebetween so that splitting of said solid beam is accomplished by expanding said solid beam by said second refractive optic and directing an expanded said solid beam into said first refractive optic where it is equally distributed to each optical fiber of said plurality.

12. A device as in claim 11 further comprising a graded index lens disposed at said end of said single optical fiber.

13. A device as in claim 11 further comprising a graded index lens disposed at an end of said each optical fiber of said plurality.

* * * * *